(12) United States Patent
Lee

(10) Patent No.: US 12,457,405 B2
(45) Date of Patent: Oct. 28, 2025

(54) SYSTEM AND METHOD FOR DRIVE CONTROL OF FRONT SVM SYSTEM

(71) Applicant: HYUNDAI MOBIS CO., LTD., Seoul (KR)

(72) Inventor: Jae Young Lee, Icheon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 98 days.

(21) Appl. No.: 18/463,767

(22) Filed: Sep. 8, 2023

(65) Prior Publication Data
US 2024/0114227 A1 Apr. 4, 2024

(30) Foreign Application Priority Data
Sep. 23, 2022 (KR) .................. 10-2022-0120434

(51) Int. Cl.
*H04N 23/61* (2023.01)
*G06V 10/764* (2022.01)
*G06V 20/56* (2022.01)

(52) U.S. Cl.
CPC .......... *H04N 23/61* (2023.01); *G06V 10/764* (2022.01); *G06V 20/588* (2022.01)

(58) Field of Classification Search
CPC .... H04N 23/61; G06V 10/764; G06V 20/588; G06V 10/25; G06V 10/774; B60R 1/24; B60R 1/27; B60R 2300/102; B60R 2300/105; B60R 2300/301; G06T 7/60; G06T 2207/30252
See application file for complete search history.

(56) References Cited

U.S. PATENT DOCUMENTS

| | | | |
|---|---|---|---|
| 10,023,198 B2 * | 7/2018 | Arndt | G06V 10/48 |
| 11,604,967 B2 * | 3/2023 | Smolyanskiy | G06N 3/063 |
| 2014/0303844 A1 * | 10/2014 | Hoffmann | B60G 17/08 701/37 |
| 2015/0049913 A1 * | 2/2015 | Zhong | G06T 7/593 382/104 |
| 2017/0132480 A1 * | 5/2017 | Han | B60R 11/04 |
| 2021/0286923 A1 * | 9/2021 | Kristensen | G01S 7/412 |
| 2024/0053266 A1 * | 2/2024 | Srinivasan | G01N 21/47 |

FOREIGN PATENT DOCUMENTS

KR 101942527 B1 1/2019

* cited by examiner

*Primary Examiner* — Richard A Hansell, Jr.
(74) *Attorney, Agent, or Firm* — NovoTechIP International PLLC

(57) ABSTRACT

A system and method for drive control of a front surround view monitoring (SVM) system includes analyzing front image data to determine whether a vehicle is rotated in a pitch direction and automatically activating the front SVM system when the vehicle is rotated in the pitch direction based on a forward driving condition of the vehicle.

7 Claims, 4 Drawing Sheets a)

b)

SYSTEM AND METHOD FOR DRIVE CONTROL OF FRONT SVM SYSTEM

CROSS-REFERENCE TO RELATED APPLICATIONS

This application claims priority under 35 U.S.C. § 119 to Korean Patent Application No. 10-2022-0120434, filed on Sep. 23, 2022, in the Korean Intellectual Property Office, the disclosure of which is incorporated herein by reference in its entirety.

TECHNICAL FIELD

The following disclosure relates to system and method for drive control of a front surround view monitoring (SVM) system, and more particularly, to system and method for drive control of the front SVM system, which may automatically control a drive state of the front SVM system by analyzing information on a road surface condition in front of a vehicle for a driver to easily check a situation in front of the vehicle.

BACKGROUND

Various sensors (such as a camera sensor or a radar sensor) may be installed in a vehicle to provide various advanced functions to help safe and comfortable driving.

Among the various advanced functions, a surround view monitoring (SVM) system is a system displaying a 360-degree region around the vehicle as an image from a viewpoint looking down at the vehicle, and mainly provides a parking related function.

The SVM system may acquire the image through a fish-eye lens installed on the front, rear, left and right sides of the vehicle and having a field of view of 180 degrees or more, and provide a screen with matched images looking down the vehicle and its surroundings from the air.

In general, when a driver turns on a vehicle engine and puts a transmission lever in an 'R' position, a rear SVM function may be automatically provided through a head unit positioned on a control panel board, and the matched images (also referred to as an image converted to a 'bird's eye view') may be displayed together with a rear camera image. Accordingly, the driver may check an obstacle around the vehicle that is out of sight, and thus have improved driving convenience.

In addition, the driver may generally drive the vehicle while looking at the front with his/her eyes in a forward driving situation where the transmission lever is positioned in a 'D' or an 'N' position. Therefore, the driver may be provided with a map or an entertainment function that is selected or set by the driver instead of a front SVM function, through the head unit.

Therefore, the driver is required to press a camera control switch and select a front camera through a separate manipulation in order to receive the SVM function in the forward driving situation because a front SVM image is displayed only in this case.

In addition, even though the front SVM image is output, the front SVM function may be automatically released to improve the driver's driving concentration through the forward gaze when the vehicle speed is generally 15 km/h or more.

However, in an actual forward driving situation, the driver does not drive only on flat ground where the driver may easily perceive a forward situation based on a road surface condition. A pitch rotation in which the vehicle is rotated around a lateral axis y may also occur due to an inclination of a road surface. Accordingly, it may be difficult for the driver to easily determine a forward ground condition due to a rapid change in an inclination of the vehicle.

For example, a sidewalk may be installed to be higher than a roadway. Therefore, when entering an underground parking lot of a building that is connected through the sidewalk, the driver may continuously drive an uphill road surface (when entering the sidewalk) and a downhill road surface (when entering the underground parking lot of the building) inevitably.

For another example, a speed bump may be installed for pedestrian safety at a starting point of a driveway, a starting point of a school zone, and an entry point of a crosswalk. In this case, the pitch rotation of the vehicle may occur while the vehicle passes the speed bump.

As such, the driver may drive the vehicle on the uphill road surface having a rapid inclination at a special condition (e.g., speed bump or sidewalk entry) rather than an uphill or downhill road having a smooth inclination on the roadway. In this case, the vehicle may face the air due to the pitch rotation of the vehicle, and it may thus be difficult for the driver to visually check the ground situation.

In addition, the vehicle may face the ground instead of the front due to the pitch rotation of the vehicle even when the vehicle drives on the downhill road surface having a rapid downward inclination (such as entering the underground parking lot of the building). Therefore, it may be difficult for the driver to check when the vehicle comes up from the underground to the ground or there is a pedestrian, which leads to a high risk of an accident.

In addition, a structure such as a guide rod may be positioned in a situation where the vehicle faces the air or the ground instead of the front. In this case, the structure may be covered by a vehicle body, making it difficult for the driver to check the structure through the eyes, which may result in a collision therebetween or road congestion caused by excessive slowness of the driver whose view is obstructed.

These problems may be fundamentally solved by driving the front SVM function in the situation where the pitch rotation of the vehicle occurs. However, even this driving of the function may be exposed to a greater risk because the driver whose view is obstructed while the driving is required to perform the separate manipulation.

A function to automatically output a front camera image when an object is detected in front of the vehicle through a front detection sensor has been recently developed. However, this function may be used to only detect the object such as the structure such as a guide rod described above and output the front camera image, and is not driven in a ground situation having a changing inclination (e.g., uphill road surface or downhill road surface).

A roadway having a smooth inclination (e.g., uphill road or downhill road) may exist in reality. Therefore, it is impossible to provide the driver with normal map or entertainment functions through the head unit if the front camera image is output whenever the ground having the changing inclination appears.

SUMMARY

An embodiment of the present disclosure is directed to providing system and method for drive control of a front surround view monitoring (SVM) system, which may provide a driver with an efficient driving assistance function and improved driving convenience by analyzing a road surface condition in front of a vehicle and automatically controlling a drive state of the front SVM system because it may be difficult for the driver to properly perceive a forward situation through the driver's view when the road surface condition in front of the vehicle has a large inclination angle.

In one general aspect, a system for drive control of a front surround view monitoring (SVM) system includes: an image receiving unit configured to receive front image data of a driving vehicle; an image analyzing unit that includes a stored network configured to determine pixel information of the front image data, the pixel information including class classification information and distance information of each pixel; an analysis processing unit configured to extract the distance information of each pixel included in a predetermined coordinate range of a region of interest from the pixel information, and to determine whether an inclination occurs in front of the driving vehicle based on the extracted distance information; and a drive control unit configured to control a drive state of the front SVM system based on a determination result of the analysis processing unit when the inclination occurs in front of the driving vehicle.

The image analyzing unit may calibrate the front image data by using a pre-stored image processing algorithm, and then input the calibrated data to the network.

The analysis processing unit may include: a region of interest-extraction unit configured to extract information on the predetermined coordinate range of the region of interest from the information analyzed by the image analyzing unit; a road surface determination unit configured to determine whether the class classification information of each pixel included in the coordinate range of the region of interest that is extracted by the region of interest-extraction unit is road surface information; a forward distance information extraction unit configured to extract the distance information of each pixel included in the coordinate range of the region of interest based on a determination result of the road surface determination unit when the class classification information of each pixel included in the coordinate range of the region of interest is the road surface information; and a vehicle analysis unit configured to calculate a difference acquired by subtracting predetermined reference distance information from the distance information of each pixel included in the coordinate range of the region of interest that is extracted by the forward distance information extraction unit, and then summing the calculated differences of all the pixels; and a final determination unit configured to compare the summed values by the vehicle analysis unit with a predetermined threshold value of a road surface inclination change, and toi determine that the inclination occurs in front of the driving vehicle when the summed value is large.

The system may further include a training process unit configured to store the network in the image analyzing unit in advance by performing a training process on the pre-stored network by using the front image data and front light detection and ranging (LiDAR) sensing data of a collection vehicle, wherein the training process unit includes: a data collection unit configured to collect each of the front image data and front LiDAR sensing data of the collection vehicle driving in a front flat ground (or plain) state or a front ramp state, which is a predetermined driving condition; a first preprocessing unit configured to classify and label the front image data into a predetermined class; a second preprocessing unit configured to map the distance information by matching the front LiDAR sensing data to each coordinate of the front image data classified and labeled by the first preprocessing unit; and a network training unit configured to train the network by inputting data acquired by the first preprocessing unit and data acquired by the second preprocessing unit into the network having an auto encoder structure with two heads, and to store the finally trained analysis network in the image analyzing unit.

The collection vehicle may acquire the front LiDAR sensing data by a LiDAR sensor mounted on the vehicle to be adjacent to a camera acquiring the front image data.

The first preprocessing unit may calibrate the front image data by using a pre-stored image processing algorithm, and then classifies and labels the front image data.

In another general aspect, a method for drive control of a front surround view monitoring (SVM) system, which uses a system for drive control of the front SVM system in which each step is performed by an arithmetic processing means includes: inputting an image (S100) of receiving front image data of a driving vehicle; analyzing the image (S200) of receiving the output class classification information and distance information of each pixel by inputting the front image data acquired in the inputting of the image (S100) to the stored network; processing the analysis (S300) of extracting the distance information of each pixel included in a predetermined coordinate range of a region of interest based on the front image data acquired using information received in the analyzing of the image (S200), and determining whether an inclination occurs in front of the driving vehicle by using the extracted distance information; and performing drive control (S400) of activating a drive state of the front SVM system based on a result generated in the processing of the analysis (S300) when the inclination occurs in front of the driving vehicle.

The processing of the analysis (S300) may include: extracting a region of interest (S310) of extracting the class classification information and the distance information of each pixel included in the predetermined coordinate range of the region of interest from the front image data; determining a road surface (S320) of determining whether the class classification information extracted in the extracting of the region of interest (S310) is road surface information; analyzing a distance (S330) of calculating a difference acquired by subtracting predetermined reference distance information from the distance information of each pixel included in the coordinate range of the region of interest that is extracted in the extracting of the region of interest (S310), and then summing the calculated differences of all the pixels based on a determination result generated in the determining of the road surface (S320) when the class classification information of each pixel included in the coordinate range of the region of interest is the road surface information; and performing a final determination (S340) of comparing the summed value acquired in the analyzing of the distance (S330) with a predetermined threshold value of a road surface inclination change, and determining that the inclination occurs in front of the driving vehicle.

The method may further include performing a training process (S10) of storing the network applied to the analyzing of the image (S200) in advance by performing a training process on the pre-stored network by using the front image data and front light detection and ranging (LiDAR) sensing data of a collection vehicle.

The performing of the training process (S10) may include: collecting data (S11) of collecting each of the front image data and front LiDAR sensing data of the collection vehicle driving in a front flat ground (or plain) state or a front ramp state, which is a predetermined driving condition; performing a first preprocessing (S12) of classifying and labeling the front image data into a predetermined class; performing a second preprocessing (S13) of mapping the distance information by matching the front LiDAR sensing data to each coordinate of the front image data classified and labeled in the performing of the first preprocessing (S12); performing network training (S14) of training the network by inputting data acquired in the performing of the first preprocessing (S12) and data acquired in the performing of the second preprocessing (S13) into the network having an auto encoder structure with two heads, and the finally trained network in the performing of the network training (S14) is stored as the network applied to the analyzing of the image (S200).

DETAILED DESCRIPTION

Hereinafter, embodiments of system and method for drive control of a front surround view monitoring (SVM) system according to the present disclosure are described in detail with reference to the accompanying drawings.

A system may be a set of components, including devices, mechanisms, means and the like, organized and regularly interacting with each other to perform a required function.

System and method for a front surround view monitoring (SVM) system according to an embodiment of the present disclosure, the system and method for drive control of the front SVM system according to the present disclosure relates to technology of providing improved driving convenience by analyzing an acquired front image data of a vehicle to recognize a situation where an inclination of a front road surface is rapidly changed, and activating drive of the front SVM system in response thereto, thereby displaying a situation in front of the vehicle to a driver whose view is partially obstructed by a pitch rotation of the vehicle.

In short, the system and method may classify a road surface region from the front image data by using a network (that is, a convergence network of a semantic segmentation network and a distance measurement network) having an auto encoder structure with two heads, and determine whether an inclination angle of the front road surface is changed based on distance information of each pixel, i.e., by comparing the distance information of each pixel with distance information of a standard flat ground.

When the vehicle is rotated in a pitch direction, the driver inside the vehicle may have a changed forward looking direction based on a direction of a vehicle body. However, a front camera may be conventionally mounted on the vehicle to face the road surface in order to identify an obstacle around the vehicle, and may thus check the road surface even when the vehicle is rotated in the pitch direction. That is, when the inclination angle of the road surface descends after ascending, the driver's view is directed upward (or toward the air) when the vehicle is at an ascending point of the inclination angle. Therefore, it may be difficult for the driver to quickly check a nearby road surface condition (or road surface situation/road surface information). On the other hand, the front SVM system may be mounted on the vehicle to face the road surface in order to identify the obstacle around the vehicle, and thus identify the road surface even when the vehicle body faces upward.

Considering this point, the present disclosure may provide the driver with significantly improved driving convenience and safety as the driver may continuously check a front region by determining whether the inclination angle of the front road surface is changed through the front image data acquired by the front camera and automatically activating the drive of the front SVM system.

Figure 1:
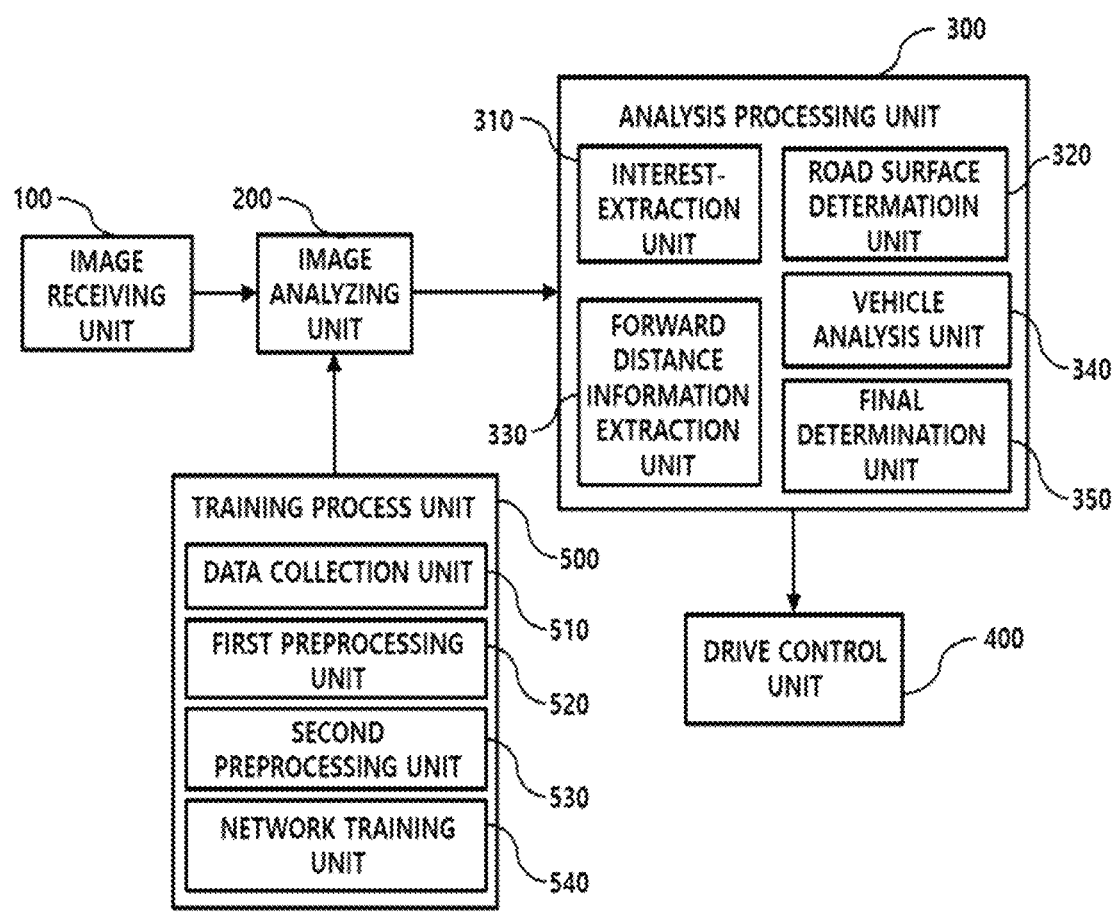
FIG. 1 is an exemplary configuration diagram showing a system for drive control of a front surround view monitoring (SVM) system according to an embodiment of the present disclosure.

FIG. 1 is a configuration diagram showing the system for drive control of the front SVM system according to an embodiment of the present disclosure.

As shown in FIG. 1, the system for drive control of the front SVM system according to an embodiment of the present disclosure may include an image receiving unit 100, an image analyzing unit 200, an analysis processing unit 300, and a drive control unit 400. Each component may preferably be driven by an arithmetic processing unit such as an electronic control unit (ECU) including a computer transmitting and receiving data through a communication channel in the vehicle.

Hereinafter, the following description provides details of each component.

The image receiving unit 100 may collect the front image data of a driving vehicle.

The front image data may refer to image data showing a front of the vehicle that is generated through the front camera or the front SVM camera system, and a linkage means generating the data may not be limited as long as the image data monitors the front of the vehicle.

The image analyzing unit 200 may analyze the class classification information and distance information of each pixel by inputting the front image data collected by the image receiving unit 100 to a stored analysis network.

Here, in order to store the analysis network in the image analyzing unit 200, the system may generate the analysis network in advance by performing a training process on the network by using the front image data and front light detection and ranging (LiDAR) sensing data of the collection vehicle, selected in a vehicle development stage.

To this end, as shown in FIG. 1, the system may further include a training process unit 500.

The training process unit 500 may be described first as including a data collection unit 510, a first preprocessing unit 520, a second preprocessing unit 530, and a network training unit 540.

The data collection unit 510 may collect each of the front image data and the front LiDAR sensing data of a collection vehicle driving in a front flat ground (or plain) state or the front image data and the front LiDAR sensing data of the collection vehicle driving in a front ramp state, which is a predetermined driving condition.

Here, the collection vehicle may refer to a sample vehicle to which all options applicable to the vehicle are applied in the vehicle development stage, and a LiDAR sensor may preferably be mounted on the vehicle to be adjacent to a camera (e.g., front camera) acquiring the front image data.

However, in reality, it is impossible to mount such an expensive LiDAR sensor on every mass-produced vehicle. Therefore, the front image data may then be analyzed by inputting the front LiDAR sensing data in the training process of the network to thus infer the distance information (or depth information) by the front LiDAR sensing data. The description describes this configuration in detail below.

The first preprocessing unit 520 may classify and label each pixel included in each front image data (e.g., front image data in flat ground driving or front image data in ramp driving) collected by the data collection unit 510 into a predetermined class.

Here, the first preprocessing unit 520 may correct lens distortion by calibrating the front image data by using a pre-stored image processing algorithm. Here, the image processing algorithm may refer to a general image processing algorithm for correcting the lens distortion, and is not limited to any specific type.

However, the front image data may be generally generated by using a fish-eye lens to have a wider angle of view. Accordingly, the first preprocessing unit 520 may first correct the lens distortion, and then classify each pixel into the predetermined class and label the same.

Here, a class that may appear in the front image data such as the road surface or an object (e.g., vehicle, person, or building) may preferably be set as the predetermined class. The front image data classified and labeled in this way by the first preprocessing unit 520 may be applied to the training process as a segmentation ground truth.

The second preprocessing unit 530 may preferably map the distance information by matching the front LiDAR sensing data to each pixel coordinate included in each front image data classified and labeled by the first preprocessing unit 520.

That is, as described above, the front LiDAR sensor mounted on the vehicle to be adjacent to the front camera may map the distance information by using the front LiDAR sensing data, i.e., by matching the coordinate of the front LiDAR sensing data to each pixel coordinate of each front image data mentioned above to be the same as each other. In this way, depth map ground truth may be generated and applied to the training process.

The network training unit 540 may train the network by inputting data acquired by the first preprocessing unit 520 and data acquired by the second preprocessing unit 530 into the network having the auto encoder structure with the two heads.

In detail, the network training unit 540 may perform the training by inputting the data acquired by the first preprocessing unit 520 and the data acquired by the second preprocessing unit 530 into the convergence network (i.e., semantic segmentation network+distance measurement network) having the auto encoder structure with the two heads.

In the training process, when the front image data is input to the network, segmentation image (or segmentation) may be output from a semantic segmentation network head, and a distance image (or depth map image) may be output from a distance measurement network head.

An objective function may be acquired by applying cross entropy loss and L1 loss to an output result, i.e., by using the segmentation ground truth acquired by the first preprocessing unit 520 and the depth map ground truth acquired by the second preprocessing unit 530. The network training unit 540 may then generate the finally trained analysis network through repeated training by updating a weight of a layer included in the analysis network for the objective function to be minimized using a stochastic gradient descent method.

The network training unit 540 may store the finally trained analysis network generated through this process into the image analyzing unit 200.

In this way, the image analyzing unit 200 may analyze the class classification information and distance information of each pixel by inputting the front image data collected by the image receiving unit 100 into the stored analysis network generated by the training process unit 500.

Here, the image analyzing unit 200 may correct the lens distortion by calibrating the front image data using the pre-stored image processing algorithm. Here, the image processing algorithm may refer to the general image processing algorithm for correcting the lens distortion, and is not limited to any specific type.

As described above, the front image data may be generally generated by using the fish-eye lens which has a wider angle of view. Accordingly, the image analyzing unit 200 may first correct the lens distortion, and then analyze the class classification information and distance information of each pixel.

Figure 2:
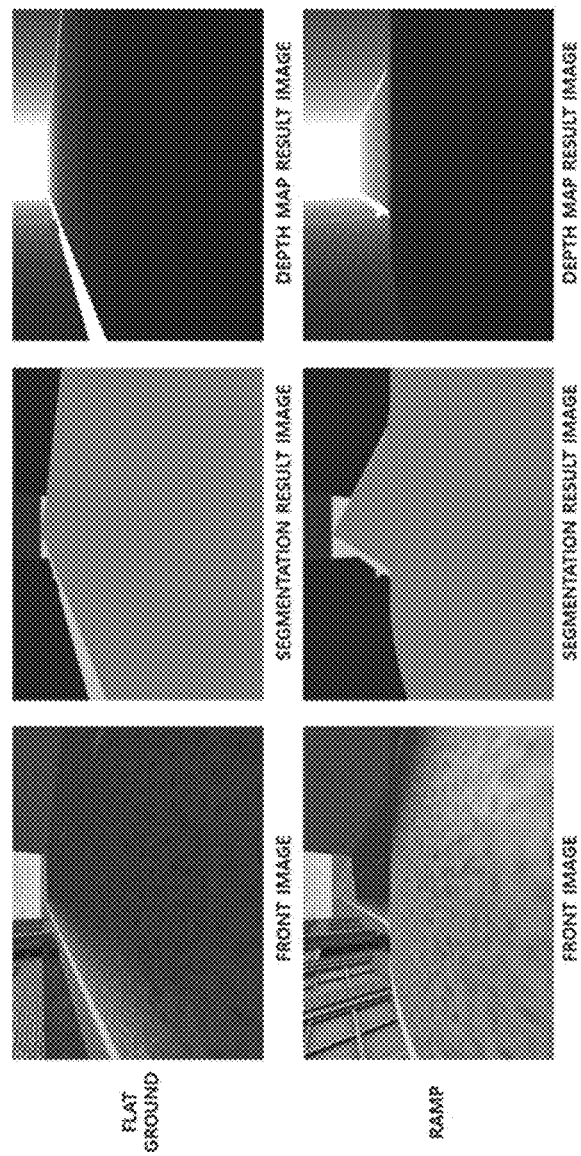
FIG. 2 is a view showing a network output result applied to system and method for drive control of the front SVM system according to an embodiment of the present disclosure.

As shown in FIG. 2, when the front image data is input to the finally trained analysis network, a classification result (or segmentation result) of the road surface region for each pixel and the distance information (or depth map) of each pixel may be output as an inference result.

That is, the front image data and the front LiDAR sensing data may be applied as analysis network training data. Accordingly, the distance information (or depth information) may be inferred and output even when the front image data is input to the analysis network by the image analyzing unit 200.

In this way, the distance information of each pixel may be inferred through only the front image data even when the expensive LiDAR sensor is not installed in every vehicle.

It may be preferable that the analysis processing unit 300 extracts the distance information of each pixel included in a predetermined coordinate range of a region of interest from the front image data based on information analyzed by the image analyzing unit 200, i.e., class classification information and distance information, and determines whether the inclination occurs in front of the driving vehicle by using the extracted distance information.

As shown in FIG. 1, the analysis processing unit 300 may include a region of interest-extraction unit 310, a road surface determination unit 320, a forward distance information extraction unit 330, a vehicle analysis unit 340, and a final determination unit 350.

The region of interest-extraction unit 310 may extract information on the predetermined coordinate range of the region of interest from the information (i.e., class classification information and distance information) acquired analyzing the front image data by the image analyzing unit 200.

Figure 3:
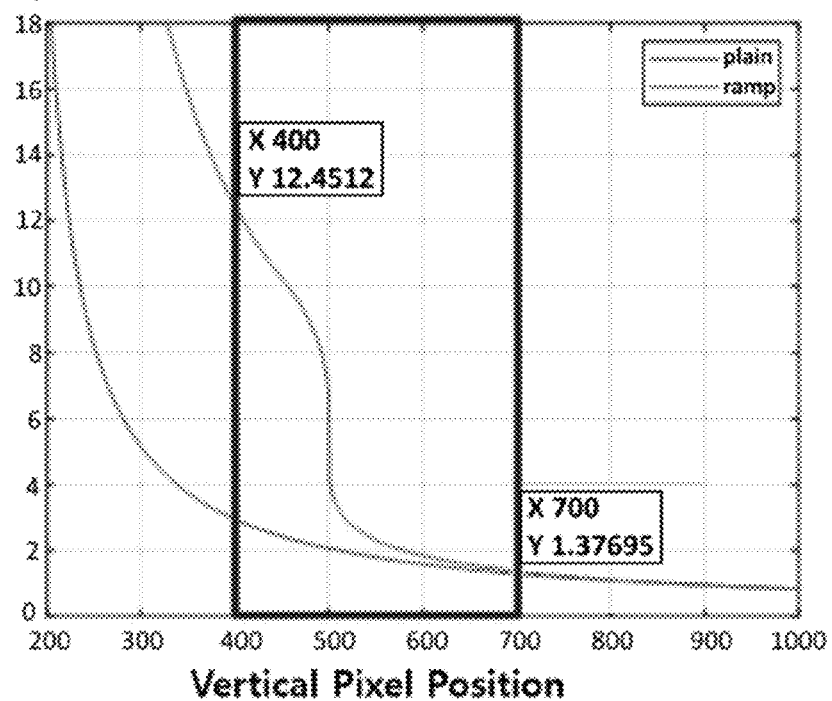
FIG. 3 shows a pixel range of a region of interest that is applied to the system and method for drive control of the front SVM system according to an embodiment of the present disclosure.
Figure 3:
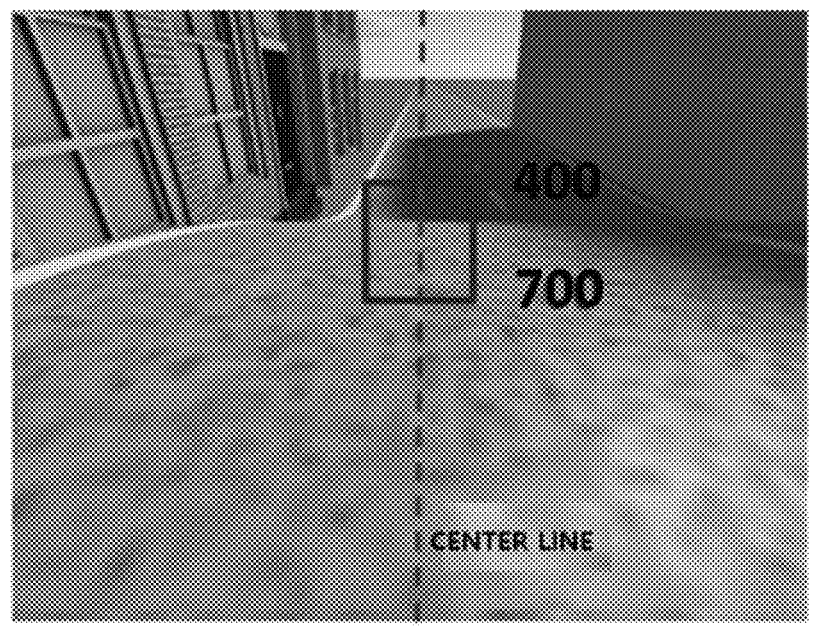

Here, the predetermined coordinate range of the region of interest may be set through an experiment performed in the vehicle development stage. In detail, as shown in FIG. 3, it may be seen that a large difference appears in a predetermined pixel coordinate range from comparison of the distance information of each pixel in a state where the road surface is the flat ground and that in a state where the road surface is a ramp. Based on an experimental result, the coordinate range of the region of interest may preferably have an x coordinate set to a coordinate range of 400 to 700 based on a vertical center line.

FIG. 3 shows a result of mapping this range to the front image data. Here, it may be seen that a portion where the inclination angle of the road surface is significantly changed due to the ramp corresponds to the coordinate range of the region of interest.

This mapping result may only correspond to the experimental result. The vehicle body of each vehicle may have a difference in height, and the coordinate range of the region of interest may thus be set through an experiment performed in each vehicle development stage.

The road surface determination unit 320 may determine whether the class classification information of each pixel included in the coordinate range of the region of interest that is extracted by the region of interest-extraction unit 310 is the road surface information.

Here, the road surface does not necessarily refer to only the roadway, and refer to a road, which is not the object (e.g., vehicle or pedestrian) because the driver may enter a building parking lot through a sidewalk based on the driving situation.

The forward distance information extraction unit 330 may preferably extract the distance information of each pixel included in the coordinate range of the region of interest based on a determination result of the road surface determination unit 320 when the class classification information of each pixel included in the coordinate range of the region of interest is the road surface information.

Here, the forward distance information extraction unit 330 may determine that the vehicle is not in a direction in which the vehicle is able to drive, and the drive control of the front SVM system may be stopped when the class classification information of each pixel included in the coordinate range of the region of interest is not the road surface information based on the determination result of the road surface determination unit 320.

That is, when a building exists in front of the vehicle, the vehicle is not in the direction in which the vehicle is able to drive. Accordingly, the driver may sufficiently perceive this situation even when the pitch rotation of the vehicle occurs. When another vehicle exists in front of the vehicle, the driver may drive along the vehicle in front even though the inclination occurs on the road surface. When another vehicle exists right in front of the vehicle, the driver's forward gaze is required to precede the front SVM system, and the drive control of the front SVM system may thus be stopped according to an embodiment of the present disclosure.

The vehicle analysis unit 340 may preferably calculate a difference acquired by subtracting predetermined reference distance information from the distance information of each pixel included in the coordinate range of the region of interest that is extracted by the forward distance information extraction unit 330, and then sum the calculated differences of all the pixels.

In detail, the vehicle analysis unit 340 may calculate a difference value between distance information ($D(x, y)$) extracted by the forward distance information extraction unit 330 and distance information ($D_{plain}(x, y)$) extracted when the vehicle drives on the flat ground, which is the predetermined reference distance information, and then sum the difference values of all the pixels (or all the pixels included in the coordinate range of the region of interest).

Here, the reference distance information may be set by mapping the distance information in such a manner that in the vehicle development stage, the front image data and the front LiDAR sensing data are collected by the collection vehicle when the vehicle is driving in a front flat ground (or plain) state, and the front LiDAR sensing data is matched to each pixel coordinate included in each front image data.

However, the vehicle body of each vehicle may have a difference in height, and the reference distance information may be also set through the experiment performed in each vehicle development stage.

The final determination unit 350 may compare the summed value acquired by the vehicle analysis unit 340 with a predetermined threshold value (or a ramp threshold) of a road surface inclination change, and determine that the inclination occurs in front of the driving vehicle, i.e., that a front road surface condition of the vehicle is the ramp, when the summed value is large. This configuration may be defined as in Expression 1 below.

$$\sum_{(x,y)\in R} D(x, y) - D_{plain}(x, y) > \text{Ramp Threshold} \qquad [\text{Expression 1}]$$

Here, R indicates the coordinate range of the region of interest.

When the front road surface condition of the vehicle is the ramp rather than the flat ground, the ramp may have a distance value greater than that of the flat ground as the vehicle descends after reaching the highest point. Therefore, the final determination unit 350 may determine whether the front inclination of the vehicle rapidly descends through Equation 1 above. The reason why the final determination unit 350 determines only the rapid descent is that, i.e., the rapid descent indicates that the vehicle is currently on a high point, and the final determination unit 350 may thus perform the analysis in relation to an uphill road surface.

In addition, the threshold value of the road surface inclination change may need to be set considering that the driver's view change angle may be different based on the road surface inclination change of each vehicle because the vehicle body of each vehicle has a difference in height. Considering this point, the threshold value of the road surface inclination change may be set through the experiment performed in each vehicle development stage.

The drive control unit 400 may preferably allow the front SVM image to be output through a head unit in the connected vehicle by activating the drive state of the front SVM system based on the determination result of the analysis processing unit 300 when the inclination occurs in front of the driving vehicle. In this way, the driver may easily check the front road surface situation even when driving on the inclination, which is a situation where the driver's forward gaze is obscure.

Figure 4:
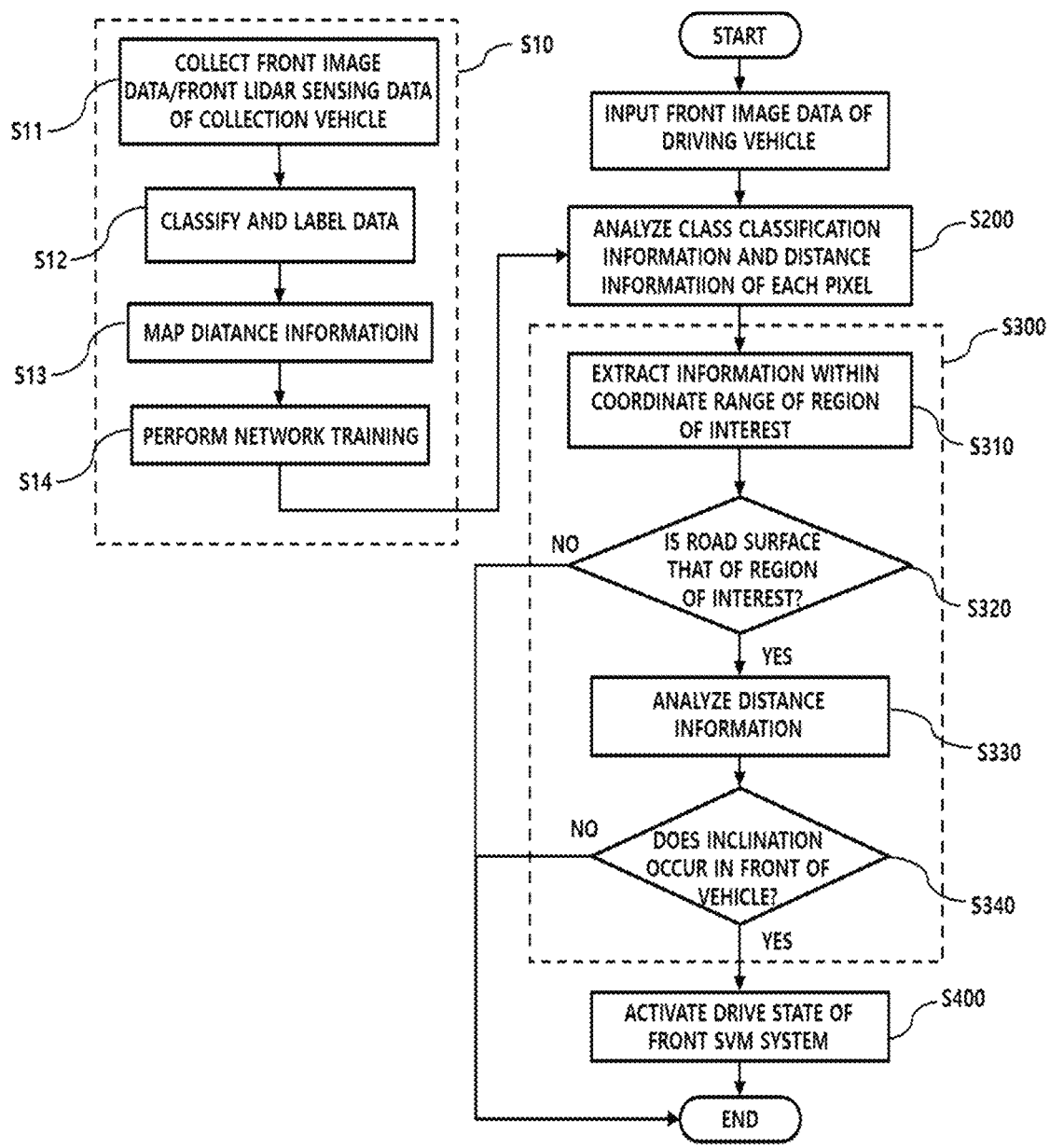
FIG. 4 is a flowchart showing the method for drive control of the front SVM system according to an embodiment of the present disclosure.

FIG. 4 is a flowchart showing the method for drive control of the front SVM system according to an embodiment of the present disclosure.

As shown in FIG. 4, the method for drive control of the front SVM system according to an embodiment of the present disclosure may include inputting an image (S100), analyzing the image (S200), processing the analysis (S300), and performing drive control (S400). The method may preferably use the system for drive control of the front SVM system in which each step is driven by the arithmetic processing means.

In the inputting of the image (S100), the image receiving unit 100 may collect the front image data of the driving vehicle.

The front image data may refer to the image data showing the front of the vehicle that is generated through the front camera or the front SVM camera system, and the linkage means generating the data may not be limited as long as the image data monitors the front of the vehicle.

In the analyzing of the image (S200), the image analyzing unit 200 may analyze the class classification information and distance information of each pixel by inputting the front image data acquired in the inputting of the image (S100) to the stored analysis network.

Here, as shown in FIG. 4, the method for drive control of the front SVM system according to an embodiment of the present disclosure may further include performing a training process (S10) of storing the analysis network applied to the analyzing of the image (S200).

In the performing of the training process (S10), the training process unit 500 may generate and store the analysis network applied to the analyzing of the image (S200) in advance by performing the training process on the network by using the front image data and front LiDAR sensing data of the collection vehicle, selected in the vehicle development stage.

In detail, the performing of the training process (S10) may include collecting data (S11), performing a first preprocessing (S12), performing a second preprocessing (S13), and performing training (S14).

In the collecting of the data (S11), the training process unit 500 may collect each of the front image data and the front LiDAR sensing data of the collection vehicle driving in a front flat ground (or plain) state or the front image data and the front LiDAR sensing data of the collection vehicle driving in a front ramp state, which is a predetermined driving condition.

Here, the collection vehicle may refer to the sample vehicle to which all the options applicable to the vehicle are applied in the vehicle development stage, and the LiDAR sensor may preferably be mounted on the vehicle to be adjacent to the camera (e.g., front camera) acquiring the front image data.

However, in reality, it is impossible to mount such an expensive LiDAR sensor on every mass-produced vehicle. Therefore, the front image data may then be analyzed by inputting the front LiDAR sensing data in the training process of the network to thus infer the distance information (or depth information) by the front LiDAR sensing data. The description describes this configuration in detail below.

In the performing of the first preprocessing (S12), the training process unit 500 may classify and label each pixel included in each front image data (e.g., front image data in flat ground driving or front image data in ramp driving) collected in the collecting of the data (S11) into the predetermined class.

In the performing of the first preprocessing (S12), the training process unit 500 may correct the lens distortion by calibrating the front image data using the pre-stored image processing algorithm. Here, the image processing algorithm may refer to the general image processing algorithm for correcting the lens distortion, and is not limited to any specific type.

However, the front image data may be generally generated by using the fish-eye lens to have a wider angle of view. Accordingly, the training process unit 500 may first correct the lens distortion, and then classify each pixel into the predetermined class and label the same.

Here, the class that may appear in the front image data such as the road surface or the object (e.g., vehicle, person, or building) may preferably be set as the predetermined class. The front image data classified and labeled in this way may be applied to the training process as the segmentation ground truth.

In the performing of the second preprocessing (S13), the training process unit 500 may map the distance information by matching the front LiDAR sensing data to each pixel coordinate included in each front image data classified and labeled in the performing of the first preprocessing (S12).

That is, as described above, the front LiDAR sensor mounted on the vehicle to be adjacent to the front camera may map the distance information by using the front LiDAR sensing data, i.e., by matching the coordinate of the front LiDAR sensing data to each pixel coordinate of each front image data mentioned above to be the same as each other. In this way, the depth map ground truth may be generated and applied to the training process.

In the performing of the network training (S14), the training process unit 500 may train the network by inputting data acquired in the performing of the first preprocessing (S12) and data acquired in the performing of the second preprocessing (S13) into the network having the auto encoder structure with the two heads.

In detail, the training process unit 500 may perform the training by inputting the data acquired in the performing of the first preprocessing (S12) and the data acquired in the performing of the second preprocessing (S13) into the convergence network (i.e., semantic segmentation network+ distance measurement network) having the auto encoder structure with the two heads.

In the training process, when the front image data is input to the network, the segmentation image (or segmentation) may be output from the semantic segmentation network head, and the distance image (or depth map image) may be output from the distance measurement network head.

The objective function may be acquired by applying cross entropy loss and L1 loss to the output result, i.e., by using the segmentation ground truth acquired in the performing of the first preprocessing (S12) and the depth map ground truth acquired in the performing of the second preprocessing (S13). The training process unit 500 may then generate the finally trained analysis network through the repeated training by updating the weight of the layer included in the analysis network for the objective function to be minimized using the stochastic gradient descent method.

The training process unit 500 may store the finally trained analysis network generated in the performing of the network training (S14) as the analysis network applied to the analyzing of the image (S200).

In this way, in the analyzing of the image (S200), the image analyzing unit 200 may analyze the class classification information and distance information of each pixel by inputting the front image data collected in the inputting of the image (S100) into the stored analysis network generated in the performing of the network training (S14).

Here, the image analyzing unit 200 may correct the lens distortion by calibrating the front image data using the pre-stored image processing algorithm. Here, the image processing algorithm may refer to the general image processing algorithm for correcting the lens distortion and is not limited to any specific type.

As described above, the front image data may be generally generated by using the fish-eye lens to have the wider angle of view. Accordingly, the image analyzing unit 200 may first correct the lens distortion, and then analyze the class classification information and distance information of each pixel.

As shown in FIG. 2, in case of the inference result (or analysis result) acquired through the analysis network, the classification result (or segmentation result) of the road surface region for each pixel and the distance information (or depth map) of each pixel may be output as the inference result.

That is, the front image data and the front LiDAR sensing data may be applied as analysis network training data. Accordingly, the distance information (or depth information) may be inferred and output even when the front image data is input to the analysis network in the inputting of the image (S100).

In this way, the distance information of each pixel may be inferred through only the front image data even when the expensive LiDAR sensor is not installed in every vehicle.

In the processing of the analysis (S300), the analysis processing unit 300 may extract the distance information of each pixel included in the predetermined coordinate range of the region of interest from the front image data based on the information analyzed in the analyzing of the image (S200), i.e., class classification information and distance information, and determine whether the inclination occurs in front of the driving vehicle by using the extracted distance information.

As shown in FIG. 4, the processing of the analysis (S300) may include extracting a region of interest (S310), determining a road surface (S320), analyzing a distance (S330), and performing a final determination (S340).

In the extracting of the region of interest (S310), the analysis processing unit 300 may extract the class classification information and the distance information of each pixel included in the predetermined coordinate range of the region of interest from the front image data.

Here, the predetermined coordinate range of the region of interest may be set through the experiment performed in the vehicle development stage. In detail, as shown in FIG. 3, it may be seen that the large difference appears in the predetermined pixel coordinate range from the comparison of the distance information of each pixel in the state where the road surface is the flat ground and that in the state where the road surface is the ramp. Based on an experimental result, the coordinate range of the region of interest may preferably have an x coordinate set to a coordinate range of 400 to 700 based on a vertical center line.

FIG. 3 shows the result of mapping this range to the front image data. Here, it may be seen that the portion where the inclination angle of the road surface is significantly changed due to the ramp corresponds to the coordinate range of the region of interest.

This mapping result may only correspond to the experimental result. The vehicle body of each vehicle may have a difference in height, and the coordinate range of the region of interest may thus be set through an experiment performed in each vehicle development stage.

In the determining of the road surface (S320), the analysis processing unit 300 may determine whether the class classification information of each pixel included in the coordinate range of the region of interest extracted in the extracting of the region of interest (S310) is the road surface information.

Here, the road surface does not necessarily refer to only the roadway, and refer to the road, which is not the object (e.g., vehicle or pedestrian) because the driver may enter the building parking lot through the sidewalk based on the driving situation.

In the analyzing of the distance (S330), the analysis processing unit 300 may extract the distance information of each pixel included in the coordinate range of the region of interest based on the determination result generated in the determining of the road surface when the class classification information of each pixel included in the coordinate range of the region of interest is the road surface information (S320).

Here, the analysis processing unit 300 may determine that the vehicle is not in the direction in which the vehicle is able to drive, and the drive control of the front SVM system may be stopped based on the determination result in the determining of the road surface when the class classification information of each pixel included in the coordinate range of the region of interest is not the road surface information (S320).

That is, when the building exists in front of the vehicle, the vehicle is not in the direction in which the vehicle is able to drive. Accordingly, the driver may sufficiently perceive this situation even when the pitch rotation of the vehicle occurs. When another vehicle exists in front of the vehicle, the driver may drive along the vehicle in front even though the inclination occurs on the road surface. When another vehicle exists right in front of the vehicle, the driver's forward gaze is required to precede the front SVM system, and the drive control of the front SVM system may thus be stopped according to an embodiment of the present disclosure.

In the analyzing of the distance (S330), the analysis processing unit 300 may calculate a difference acquired by subtracting predetermined reference distance information from the extracted distance information of each pixel included in the coordinate range of the region of interest, and then sum the calculated differences of all the pixels. In detail, the analysis processing unit 300 may calculate the difference value between the extracted distance information (D(x, y)) and the distance information ($D_{plain}$(x, y)) extracted when the vehicle drives on the flat ground, which is the predetermined reference distance information, and then sum the difference values of all the pixels (or all the pixels included in the coordinate range of the region of interest).

Here, the reference distance information may be set by mapping the distance information in such a manner that in the vehicle development stage, the front image data and the front LiDAR sensing data are collected by the collection vehicle when the vehicle is driving in the front flat ground (or plain) state, and the front LiDAR sensing data is matched to each pixel coordinate included in each front image data.

However, the vehicle body of each vehicle may have a difference in height, and the reference distance information may be also set through the experiment performed in each vehicle development stage.

In the performing of the final determination (S340), the analysis processing unit 300 may compare the summed value acquired in the analyzing of the distance (S330) with the predetermined threshold value (or a ramp threshold) of the road surface inclination change, and determine that the inclination occurs in front of the driving vehicle, i.e., that the front road surface condition of the vehicle is the ramp. This configuration may be defined as in Expression 1 above.

When the front road surface condition of the vehicle is the ramp rather than the flat ground, the ramp may have the distance value greater than that of the flat ground as the vehicle descends after reaching the highest point. Therefore, the analysis processing unit 300 may determine whether the front inclination of the vehicle rapidly descends through Equation 1 above. The reason why the training process unit 500 determines only the rapid descent is that, i.e., the rapid descent indicates that the vehicle is currently on the high point, and the analysis processing unit 300 may thus perform the analysis in relation to the uphill road surface.

In addition, the threshold value of the road surface inclination change may need to be set considering that the driver's view change angle may be different based on the road surface inclination change of each vehicle because the vehicle body of each vehicle has a difference in height. Considering this point, the threshold value of the road surface inclination change may be set through the experiment performed in each vehicle development stage.

The present disclosure described above may be implemented as a computer-readable code on a medium in which a program is recorded. The computer-readable medium may include any type of recording device storing data which may be read by a computer system. Examples of the computer-readable medium may include a hard disk drive (HDD), a solid state disk (SSD), a silicon disk drive (SDD), a read only memory (ROM), random access memory (RAM), a compact disk read only memory (CD-ROM), a magnetic tape, a floppy disk, an optical data storage device, or the like, and also include those implemented in the form of a carrier wave (e.g., transmission over the internet).

As set forth above, the system and method for drive control of the front SVM system according to the present disclosure may provide the improved driving convenience by analyzing the front image data of the driving vehicle to recognize the situation where the inclination of the front road surface is rapidly changed, and activating the drive of the front SVM system in response thereto, thereby displaying the situation in front of the vehicle to the driver whose view is partially obstructed by the pitch rotation of the vehicle. In addition, the computer may include the system for drive control of the front SVM system of the present disclosure.

That is, when the vehicle is rotated in the pitch direction due to the inclination of the front road surface, the driver inside the vehicle may have a changed forward looking direction based on the direction of the vehicle body. However, the front camera may be conventionally mounted on the vehicle to face the road surface in order to identify the obstacle around the vehicle, and may thus check the road surface even when the vehicle is rotated in the pitch direction. Considering this point, the present disclosure may provide the driver with the significantly improved driving convenience and safety as the driver may continuously check the front region by determining whether the inclination angle of the front road surface is changed through the front image data acquired by the front camera and automatically activating the drive of the front SVM system.

Although the embodiments of the present disclosure are described as above, the embodiments disclosed in the present disclosure are provided not to limit the spirit of the present disclosure, but to describe the present disclosure. Therefore, the spirit of the present disclosure may include not only each disclosed embodiment, but also a combination of the disclosed embodiments. Further, the scope of the present disclosure is not limited by these embodiments. In addition, it is apparent to those skilled in the art to which the present disclosure pertains that a variety of variations and modifications could be made without departing from the scope of the present disclosure as defined by the appended claims, and all such appropriate variations and modifications should also be understood to fall within the scope of the present disclosure as equivalents.

What is claimed is:

1. A system for drive control of a front surround view monitoring (SVM) system, the system comprising:
    an image receiving unit configured to receive front image data of a driving vehicle;
    an image analyzing unit including a stored network configured to determine pixel information of the front image data, the pixel information including class classification information and distance information of each pixel of the front image data;
    an analysis processing unit configured to extract the distance information of each pixel included in a predetermined coordinate range of a region of interest from the pixel information determined by the image analyzing unit and to identify when an inclination occurs in front of the driving vehicle based on the extracted distance information; and
    a drive control unit configured to control a drive state of the front SVM system when the inclination is identified in front of the driving vehicle by the analysis processing unit,
    wherein the analysis processing unit includes:
    a region of interest-extraction unit configured to extract the class classification and the distance information of each pixel in the predetermined coordinate range of the region of interest from the pixel information analyzed by the image analyzing unit;
    a road surface determination unit configured to determine whether the class classification information of each pixel included in the predetermined coordinate range of the region of interest that is extracted by the region of interest-extraction unit is road surface information;
    a forward distance information extraction unit configured to extract the distance information of each pixel included in the predetermined coordinate range of the region of interest based on a determination result of the road surface determination unit when the class classification information of each pixel included in the coordinate range of the region of interest is the road surface information;
    a vehicle analysis unit configured to calculate a difference acquired by subtracting predetermined reference distance information from the distance information of each pixel included in the predetermined coordinate range of the region of interest that is extracted by the forward distance information extraction unit, and then summing the calculated difference of all the pixels included in the predetermined coordinate range of the region of interest to generate a summed value; and
    a final determination unit configured to compare the summed value with a predetermined threshold value of a road surface inclination change and to determine that the inclination occurs in front of the driving vehicle based on a comparison result.

2. The system of claim 1, wherein the image analyzing unit calibrates the front image data using a pre-stored image processing algorithm, and then inputs the calibrated data to the stored network.

3. The system of claim 1, further comprising a training process unit configured to perform a training process on the stored network using the front image data and front light detection and ranging (LiDAR) sensing data of a collection vehicle,
    wherein the training process unit includes:
    a data collection unit configured to collect each of the front image data and the front LiDAR sensing data of the collection vehicle driving in a front flat ground state or a front ramp state;
    a first preprocessing unit configured to classify the front image data into a predetermined class and label the front image data;
    a second preprocessing unit configured to map the distance information by matching the front LiDAR sensing data to each coordinate of the front image data classified and labeled by the first preprocessing unit; and a network training unit configured to train the stored network by inputting data acquired by the first preprocessing unit and data acquired by the second preprocessing unit into the stored network, the stored network having an auto encoder structure with two heads.

4. The system of claim 3, wherein the collection vehicle acquires the front LiDAR sensing data from a LiDAR sensor mounted on the collection vehicle adjacent to a camera that acquires the front image data.

5. The system of claim 3, wherein the first preprocessing unit calibrates the front image data using a pre-stored image processing algorithm, and then classifies and labels the front image data.

6. A method for drive control of a front surround view monitoring (SVM) system, which uses a system for drive control of the front SVM system in which each step is performed by an arithmetic processing unit, the method comprising:
receiving front image data of a driving vehicle;
analyzing the front image data using a stored network, the stored network being configured to determine pixel information of the front image data, the pixel information including class classification information and distance information of each pixel of the front image data;
extracting the distance information of each pixel included in a predetermined coordinate range of a region of interest from the pixel information;
determining when an inclination occurs in front of the driving vehicle using the extracted distance information; and
controlling a drive state of the front SVM system when the inclination occurs in front of the driving vehicle,
wherein analyzing the front image data further comprises:
extracting the class classification information and the distance information of each pixel included in the predetermined coordinate range of the region of interest from the pixel information;
determining whether the extracted class classification information is road surface information for a road surface;
calculating a difference acquired by subtracting predetermined reference distance information from the distance information of each pixel included in the predetermined coordinate range of the region of interest for the pixels having the road surface information and then summing the calculated difference of each pixel included in the predetermined coordinate range of the region of interest to generate a summed value;
comparing the summed value with a predetermined threshold value of a road surface inclination change; and
determining that the inclination occurs in front of the driving vehicle based on a comparison result.

7. The method of claim 6, further comprising:
training the stored network in advance using the front image data and front light detection and ranging (LiDAR) sensing data of a collection vehicle,
wherein training the stored network further comprises:
collecting each of the front image data and front LiDAR sensing data of the collection vehicle driving in a front flat ground state or a front ramp state;
performing a first preprocessing of classifying and labeling the front image data into a predetermined class;
performing a second preprocessing of mapping the distance information by matching the front LiDAR sensing data to each coordinate of the front image data classified and labeled in the performing of the first preprocessing;
training the network by inputting data acquired in the performing of the first preprocessing and data acquired in the performing of the second preprocessing into the network, the network having an auto encoder structure with two heads, and
storing the trained network as the stored network.

* * * * *